United States Patent
Trama et al.

(10) Patent No.: US 9,632,745 B2
(45) Date of Patent: Apr. 25, 2017

(54) VISUAL FOCUS ASSISTANCE FOR OPERATING AN AUDIO CONTROL SURFACE

(71) Applicant: Avid Technology, Inc., Burlington, MA (US)

(72) Inventors: Eduardo Dias Trama, San Jose, CA (US); Steven H. Milne, Palo Alto, CA (US)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 14/845,575

(22) Filed: Sep. 4, 2015

(65) Prior Publication Data

US 2017/0068504 A1    Mar. 9, 2017

(51) Int. Cl.
*H04R 29/00* (2006.01)
*G06F 3/16* (2006.01)
*G06F 17/21* (2006.01)

(52) U.S. Cl.
CPC ............ *G06F 3/162* (2013.01); *G06F 17/214* (2013.01); *H04R 29/00* (2013.01)

(58) Field of Classification Search
CPC .............. H04R 2225/81; H04R 1/1041; H04R 2227/003; H04R 2227/009; H04R 2420/01; H04R 2420/07; H04R 2430/01; H04R 27/00; H04R 3/12; H04R 2225/41; H04R 2225/83; H04R 25/305; H04R 25/453; H04R 25/554; H04R 25/558; H04R 25/70; H04R 1/026

USPC ..... 381/58, 61, 104, 107, 86, 106, 109, 119, 381/60

See application file for complete search history.

(56) References Cited

U.S. PATENT DOCUMENTS

| | | | | |
|---|---|---|---|---|
| 5,530,765 | A * | 6/1996 | Zampini | H04H 60/04 381/104 |
| 2006/0093998 | A1* | 5/2006 | Vertegaal | G06F 3/011 434/236 |
| 2014/0070729 | A1* | 3/2014 | Sako | H05B 37/0236 315/307 |
| 2014/0270266 | A1* | 9/2014 | Vumbaco | H04R 3/00 381/123 |
| 2015/0078584 | A1* | 3/2015 | Moon | G10H 1/46 381/104 |

* cited by examiner

*Primary Examiner* — Akelaw Teshale
(74) *Attorney, Agent, or Firm* — Oliver Strimpel

(57) ABSTRACT

Large numbers of similar-looking or identical physical controls on an audio control surface can make it difficult for operators to rapidly locate desired controls. Highlighting of selected controls focuses the operator's visual attention on controls the operator is manipulating, or has just manipulated and is likely to manipulate again. Controls peripheral to or otherwise related to manipulated controls may also be highlighted. Highlighting methods include the use of control illumination intensity, color, and labeling display text. Visual focusing may include highlighting relationships between channel strips or between individual physical controls, or between the physical controls of a surface and one or more digital audio workstations.

24 Claims, 11 Drawing Sheets

VISUAL FOCUS ASSISTANCE FOR OPERATING AN AUDIO CONTROL SURFACE

BACKGROUND

Audio control surfaces are used in offline/post production and live contexts to select and control the values of the various parameters that determine the sound of an audio production. In all but the very simplest of productions, the audio is composed of multiple tracks, which are fed as inputs into an audio control surface for mixing by an operator, before being output to a monitor, venue loudspeaker, or to a recording device. It is a common aspect of audio control surfaces that the controls used to control the parameters of each track are repeated, with each track being assigned its own set of physical controls, each of these sets commonly referred to as a channel strip. This repetition can result in a large number of controls. It is not uncommon for a control surface in a live production to have over a hundred channel strips, with 24 controls on each strip. This can result in an audio control surface up to about ten feet in length, and 3-4 feet in width.

When an operator of an audio control surface is presented with a large number of controls, especially at close quarters where they extend beyond a single visual field of an operator, it can be difficult to maintain visual focus. For example, if an operator who is working on a first set of controls at one end of an audio control surface needs to perform a one-time quick adjustment of a second set of controls located at the opposite end of the surface before continuing to work on the first set of controls, it becomes necessary to shift attention from one end of the surface to the other. However, after performing the adjustment on the second set of controls, it may be difficult to return to the first set of controls quickly amongst the many identical-looking banks of controls. Rapidly returning to a desired control may even be problematic when the controls being used are in close proximity to each other, such as when controlling different parameters on adjacent or nearly adjacent channel strips. Rapid refocusing may be challenging for an operator viewing a projection screen while mixing audio for a movie, or in a live sound setting in which an operator's eyes must switch rapidly back and forth from performers on a stage to the control surface. This problem may be exacerbated when the operator is working under reduced lighting conditions, such as in a darkened auditorium, or in a dimly lit studio. There is therefore a need for methods and systems to aid the visual focus of an audio control surface operator.

SUMMARY

Systems and methods described herein assist an operator of an audio control surface to maintain visual focus, especially when using large control surfaces, or when working in reduced lighting conditions. Visual focus methods include highlighting selected controls via illumination of varying intensities and colors and varying font style and size on control-labelling displays.

In general, in one aspect, a method of focusing attention of a user of an audio control surface comprises: in response to the user operating a first physical control of the audio control surface, applying a first highlight type to the first physical control of the audio control surface; and subsequent to step (i), in response to the user operating a second physical control of the audio control surface, applying the first highlight type to the second physical control of the audio control surface, and changing an applied highlight to the first physical control from the first highlight type to a second highlight type.

Various embodiments include one or more of the following features. The first highlight type comprises a first illumination intensity and the second highlight type comprises a second illumination intensity. The first illumination intensity is greater than the second illumination intensity. The audio control surface includes a plurality of physical controls in addition to and including the first and second physical controls, and each of the plurality of physical controls is illuminated by a preset illumination intensity; applying the first highlight type to a first given control comprises applying a first reduced illumination intensity to each of the plurality of physical controls except the first given control; applying the second highlight type to a second given control comprises applying a second reduced illumination intensity to the second given control; and the second reduced illumination intensity is brighter than the first reduced illumination intensity. The first highlight type comprises a first illumination color and the second highlight type comprises a second illumination color. The audio control surface includes a plurality of physical controls in addition to and including the first and second physical controls; each of the plurality of physical controls is labeled with a corresponding programmable display; applying the first highlight type to a first given physical control comprises using the programmable display corresponding to the first given physical control to label the first given physical control using text having a first font characteristic; applying the second highlight type to a second given physical control comprises using the programmable display corresponding to the second given physical control to label the second given physical control using text having a second font characteristic; and the first and second font characteristics are different from a font characteristic used in text on corresponding programmable displays labelling each of the physical controls other than the first and second physical controls.

In general, in another aspect, a method of focusing attention of a user of an audio control surface comprises: in response to the user operating a first physical control of the audio control surface: applying a first highlight type to the first physical control of the audio control surface; and applying a second highlight type to a second control of the audio control surface.

Various embodiments include one or more of the following features. The second highlight is substantially the same as the first highlight. In response to the user positioning a finger in proximity to the first physical control, applying a third highlight type to the first physical control of the audio control surface. The third highlight type is substantially the same as the first highlight type. In response to the user positioning a finger in proximity to the first physical control, applying a fourth highlight type to a second control of the audio control surface. The fourth highlight type is substantially the same as the second highlight type. The second control is spatially proximate to the first physical control. The second control is spatially proximate to the first physical control. The first physical control controls a first audio parameter of a given functional type and the second control controls a second audio parameter of the given functional type. The first physical control controls a first audio parameter, the second control controls a second audio parameter, and the second audio parameter is related to the first audio parameter. The first audio parameter is a VCA master parameter and the second audio parameter is a slave parameter of the VCA master parameter. The first physical control of the audio control surface is an expand mode switch of a first channel strip. The first channel strip is assigned to control parameters of a first audio channel; the second control of the audio control surface is a control of a second channel strip; and when an expand mode of the first channel strip has been selected by operating the expand mode switch of the first channel strip, the second control is temporarily assigned to control a parameter of the first channel. The second control is a physical control, and wherein the first and second physical controls belong to a given module of the audio control surface, and wherein the given module comprises a plurality of physical controls, further comprising applying the second highlight type to each physical control of the plurality of physical controls of the given module. The second control is displayed on a video display in data communication with the audio control surface. The first highlight type comprises a first illumination intensity; and if the second control of the audio control surface is a physical control, the second highlight type comprises a second illumination intensity. The second physical control is one of a set of one or more physical controls specified by the user, wherein a highlight is applied to each of the set of one or more physical controls in addition to the second control when the user operates the first physical control.

In general, in a further aspect, a method of focusing attention of a user of an audio control surface comprises: in response to the user operating a control implemented in a graphical user interface of a digital audio workstation, wherein the control controls a given audio parameter, applying a highlight to a physical control of the audio control surface that also controls the given audio parameter.

In general, in yet a further aspect, an audio control surface comprising: a plurality of physical controls, wherein each physical control of the plurality of physical controls comprises: illumination for applying a highlight to the physical control; and a processor for controlling the illumination, wherein the processor is configured to: (i) in response to the user operating a first physical control of the audio control surface, causing the processor to apply a first highlight type to the first physical control of the audio control surface; and (ii) subsequent to step (i), in response to the user operating a second physical control of the audio control surface, causing the processor to apply the first highlight type to the second physical control of the audio control surface, and to change an applied highlight to the first physical control from the first highlight type to a second highlight type.

In general, in a still further aspect, an audio control surface comprises: a plurality of physical controls, wherein each physical control of the plurality of physical controls comprises: illumination for applying a highlight to the physical control; and processor for controlling the illumination, wherein the processor is configured to: in response to the user operating a first physical control of the audio control surface, causing the processor to apply a first highlight type to the first physical control of the audio control surface and a second highlight type to a second control of the audio control surface.

DETAILED DESCRIPTION

Audio control surfaces are characterized by large arrays of similar-looking physical controls. In a typical configuration, a control surface includes a channel strip for controlling values of parameters for each of a number of channels, with each channel strip including knobs, faders, and switches. Unlike the user interfaces usually implemented on video display screens, in which only the controls required for a given software module or function are displayed at any one time, the physical controls of an audio control surface are always present in front of the operator. This permanent, physical presence means that an operator's attention may be focused only by emphasizing and/or de-emphasizing the appearance of controls, rather than by removing them entirely from view.

Audio control surface operators often need to work rapidly. For example, in a live performance setting, the operator needs to respond to, or even anticipate the performers, adjusting various audio parameters quickly before amplified sound from a channel it controls becomes too loud or too soft, or has the wrong EQ. In a large performance venue, there may be well over one hundred tracks. Unless the operator is intimately familiar with the assignment of tracks to surface controls, and the position of the controls, there may be undesirable delays while the operator searches for the correct control. Furthermore, controls that may need to be operated in rapid succession may be located at a considerable physical distance from each other across the control surface, making the controls harder to locate rapidly. Returning back to a recently manipulated control may thus be slowed by the need to return visual focus to the control.

In the context of mixing audio for a film or video, operators constantly change their visual focus from a screen showing the moving imagery to the mixing controls of the audio control surface. In a typical scene, an operator may simultaneously need to adjust an actor's voice level as well as the background sound EQ, requiring close attention to the screen and the control surface. When performing studio mixing of music, an operator typically moves back and forth between different channel strips to adjust multiple controls, such as EQ, Reverberation, and audio level on each strip. In each of these contexts, operator delays caused by searching for the right controls, or even mistakenly adjusting a wrong control, are undesirable.

The methods and systems described herein bring temporary visual focus to touched and/or hovered control surface modules, channel strips, or individual controls.

Figure 1A:
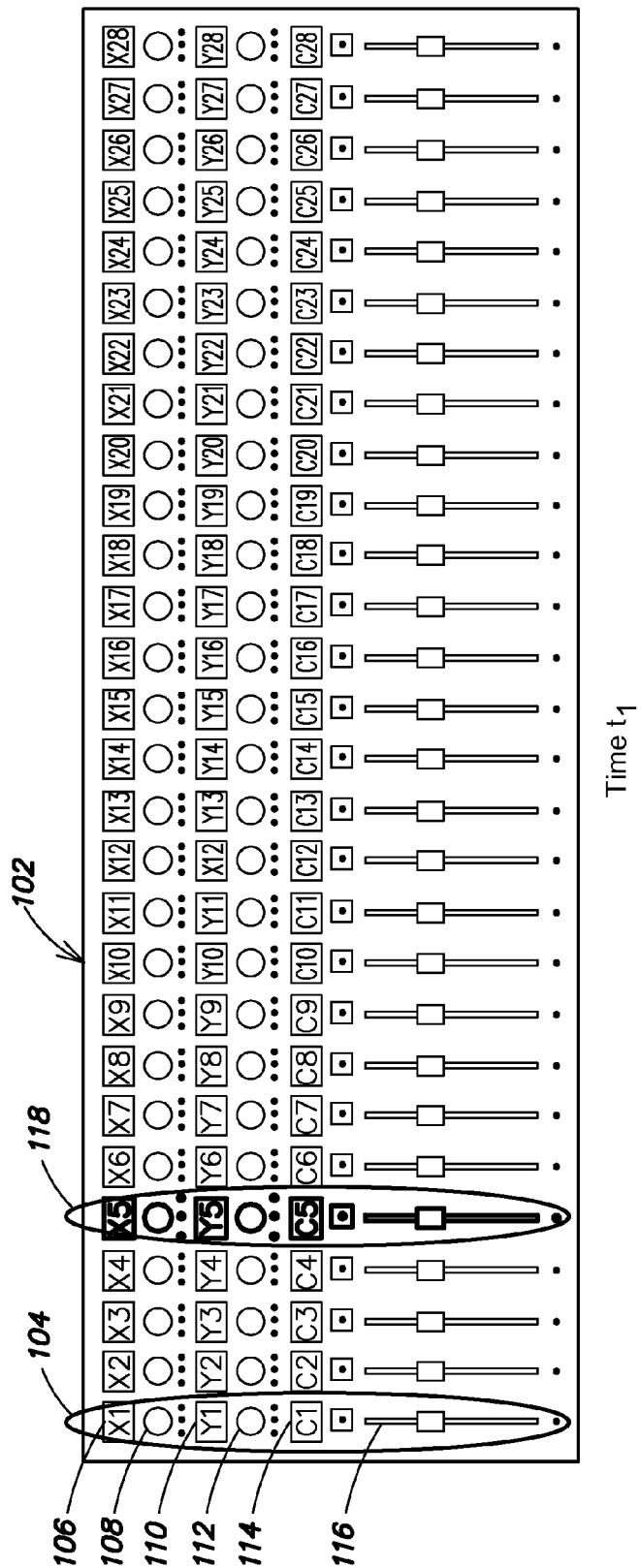
FIG. 1A is a diagrammatic illustration of an audio control surface at time $t_1$ with the physical controls of a first channel strip highlighted with a bright level illumination.
Figure 1B:
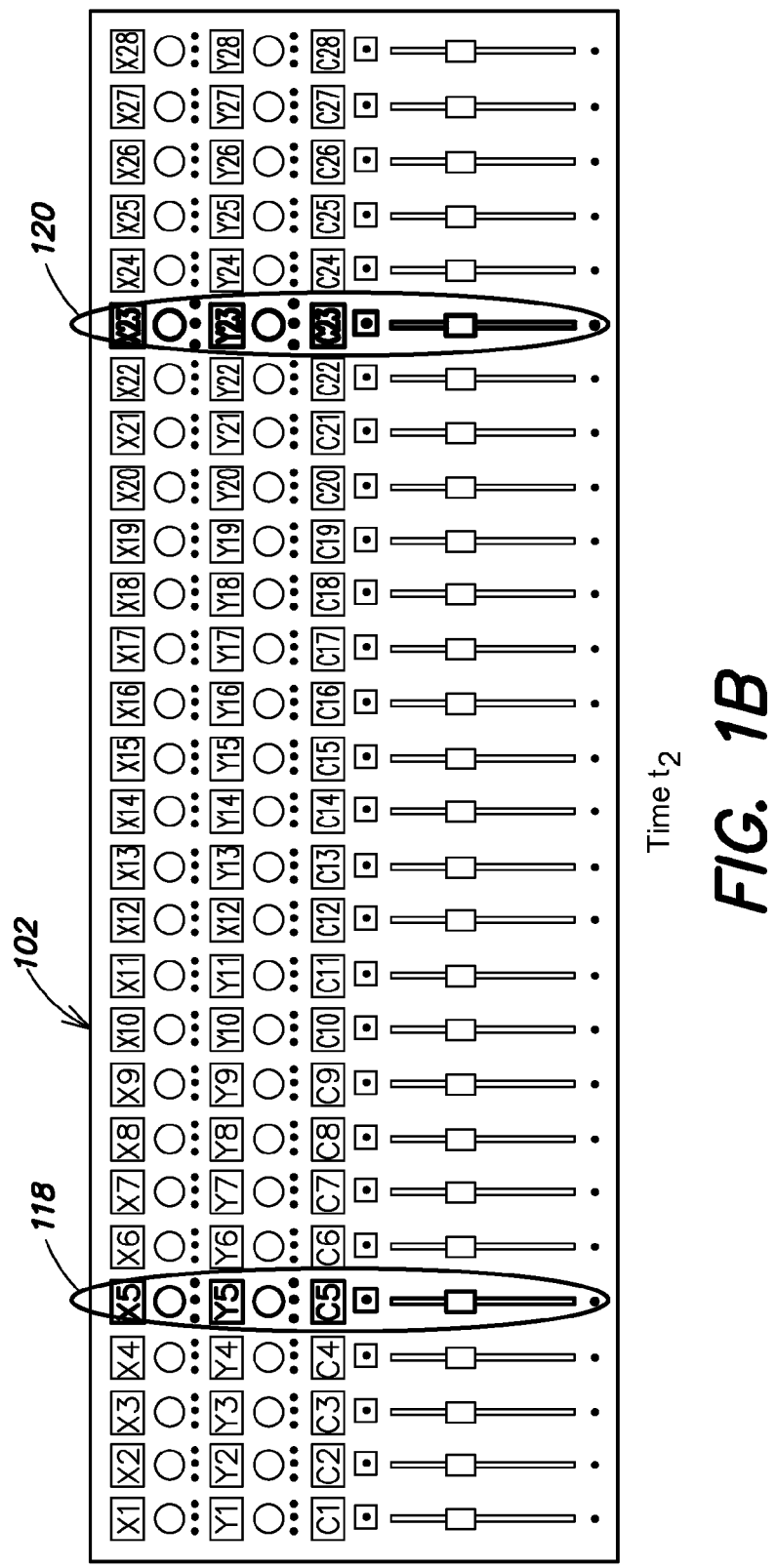
FIG. 1B is a diagrammatic illustration of the audio control surface of FIG. 1A at time $t_2$ subsequent to $t_1$, with the physical controls of a second channel strip highlighted with a bright level of illumination and the first channel strip that is highlighted in FIG. 1A highlighted with a dimmer level of illumination.

FIGS. 1A and 1B illustrate a first type of visual attention focusing that assists an operator to identify the recent history of his actions. One context in which such historical focusing of attention is needed arises when performing initial set up for a group of performers, such as a rock or jazz band. An operator may make initial, preview adjustments for drum set levels, vocals, guitar, and keyboard. After a round of adjustments, it is often necessary to return to the same controls to perform a further adjustment, often making several cycles of progressively more refined adjustments. Historical highlighting helps the operator to identify and return to the subset of controls being used repeatedly in this process.

FIG. 1A is a diagrammatic representation of audio control surface 102. The illustrated surface includes 28 channel strips, each channel strip providing a number of physical controls for controlling parameters of an audio channel assigned to that channel strip. For example, the first channel strip to the left (104) includes programmable display 106 (such as an LCD or OLED) for displaying the name of the first parameter that is controlled by first parameter knob 108, programmable display 110 for displaying the name of the second parameter that is controlled by second parameter knob 112, programmable display 114 for displaying the name of the channel to which channel strip 104 is assigned, and fader 116 for continuously adjusting a value of an assigned parameter of the channel. As used herein, a physical control refers to a control that may be physically grasped and manipulated by an operator, in contrast to a control implemented in a graphical user interface on a video display. In audio control surface 102 illustrated in FIG. 1A, the parameter knobs (e.g., 108, 112) and faders (e.g., 116) are examples of physical controls.

Figure 2A:
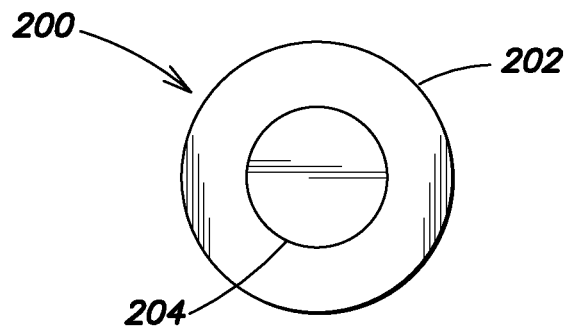
FIG. 2A is a top view illustration of a parameter control knob of an audio control surface.
Figure 2B:
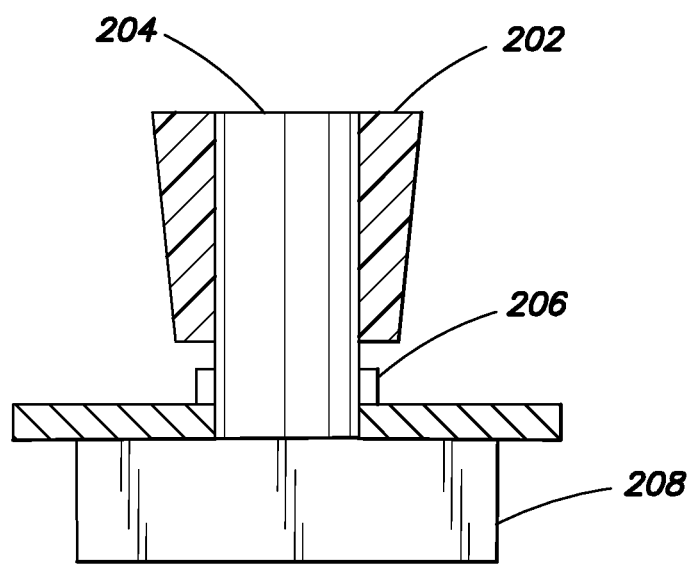
FIG. 2B is a side view illustration of a parameter control knob of an audio control surface.

An example of an individual physical control is illustrated in FIGS. 2A and 2B. In the top view shown in FIG. 2A, parameter control knob 200 includes cylindrical light pipe 202 disposed around encoder spindle 204. The side view shown in FIG. 2A illustrates light pipe 202, which receives light from an LED ring source of illumination 206. Rotation of the knob is transmitted via spindle 204 to encoder 208.

FIG. 1A illustrates a situation in which at time $t_1$ an operator manipulates a control on channel strip 118 that controls channel 5. Although the implementation of highlighting in this example is described in terms of illumination intensity of highlighted controls, other highlighting methods, such as those described below, may be used. The illumination of all the controls belonging to channel strip 118 set to a high intensity, or even to the maximum possible. This focuses attention of the operator on the region he has just manipulated. Subsequently, at time $t_2$, the operator works on a second channel strip, and manipulates at least one control of that strip. FIG. 1B illustrates the highlighting when the operator manipulates channel 23 (120) after having previously manipulated channel 5. Channel strip 120 is highlighted by bright illumination at the same intensity level used to highlight channel 5 at time $t_1$. In addition, the illumination of channel strip 118 is dimmed, but it is still maintained at a brighter level than its surrounding channel strips. Over time, channel strip 118 may be further dimmed, with highlighting disappearing after a certain time. Retaining the highlighting of channel strip 118 even after the operator has shifted attention to channel strip 120 located near the opposite end of the audio control makes it easy for the operator to navigate back to channel 5. Using highlighting to draw attention to the recent history of the controls used by the operator helps focus the operator on the areas of the control surface that are likely to be needed again.

Highlighting may be used to focus attention not only on controls that have just been used, but also further back in time, for example to the last but one control used, and the one before that. For each step back in time, the level of highlighting may be reduced, such as by a diminishing the intensity of control illumination. The extent of historical highlighting, i.e., the number of previously operated controls, and/or the timing and profile of the highlighting reduction over time, or as a function of the number of subsequent controls operated, may be adjusted automatically, or configured by the user.

FIGS. 1A and 1B illustrate the highlighting of entire channel strips corresponding to the individual controls that have been manipulated. In other words, if the operator manipulates first parameter knob 112 of channel 1, the entire channel strip 104 is highlighted. In an alternative scheme, only the individual control that has been manipulated is highlighted. This applies both to the most recently manipulated control as well as to previously manipulated controls, for which the highlighting may be dimmed as time passes or as other controls are manipulated.

Figure 3:
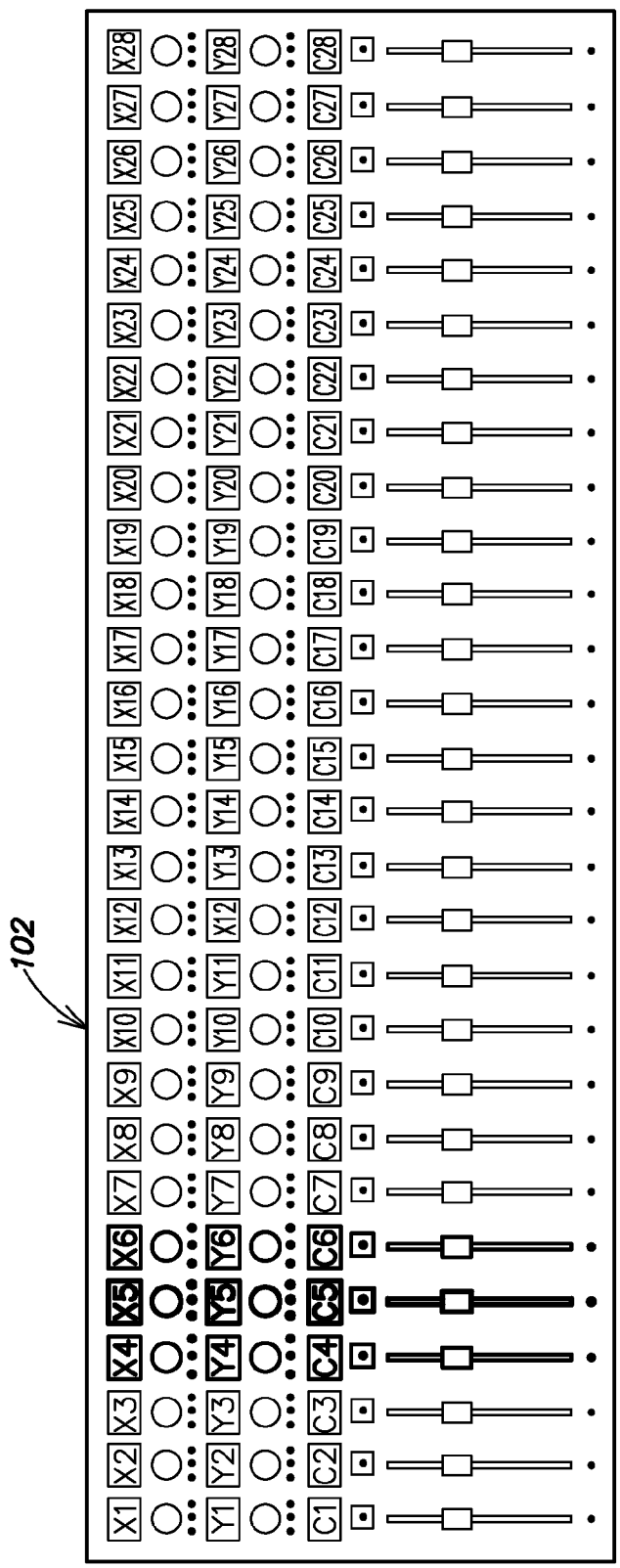
FIG. 3 is a diagrammatic illustration of an audio control surface with the physical controls of a channel strip highlighted with a brighter level of illumination and the physical controls of adjacent channel strips illuminated with a dimmer level of illumination.

Highlighting may also be extended to an area surrounding the manipulated individual control or channel strip in order to increase the user's targeting ability. This situation is shown in FIG. 3, in which channels 4 and 6 are given an intermediate highlight, such as illumination at about half the intensity of the currently focused channel 5, which is illuminated at or near full intensity. The extent of peripheral control highlighting may be configured by the user.

Figure 4:
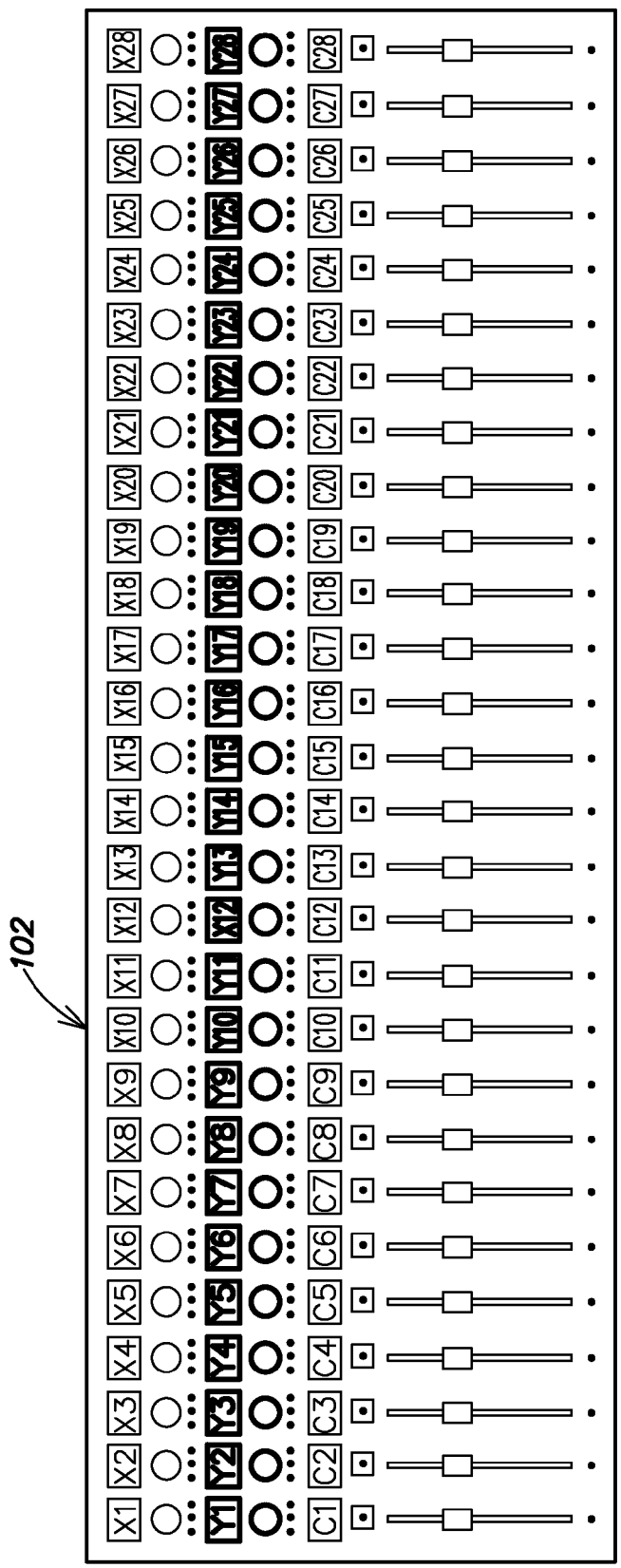
FIG. 4 is a diagrammatic illustration of an audio control surface in which all the physical controls that control parameters of a given functional type are highlighted.

When an operator is interested in manipulating the values of a given audio parameter for all channels, the operator's visual attention may be focused on all the controls for the given parameter. FIG. 4 illustrates an example in which controlling parameter Y on channel 5, for example, causes the parameter Y control knob for all the channels to be highlighted. This may be useful for creating a monitor mix on an auxiliary send, for example. For some functions, such as equalization (EQ), more than one parameter is needed to define each EQ setting. In such cases, controls for all the applicable parameters are highlighted on each strip.

Figure 5:
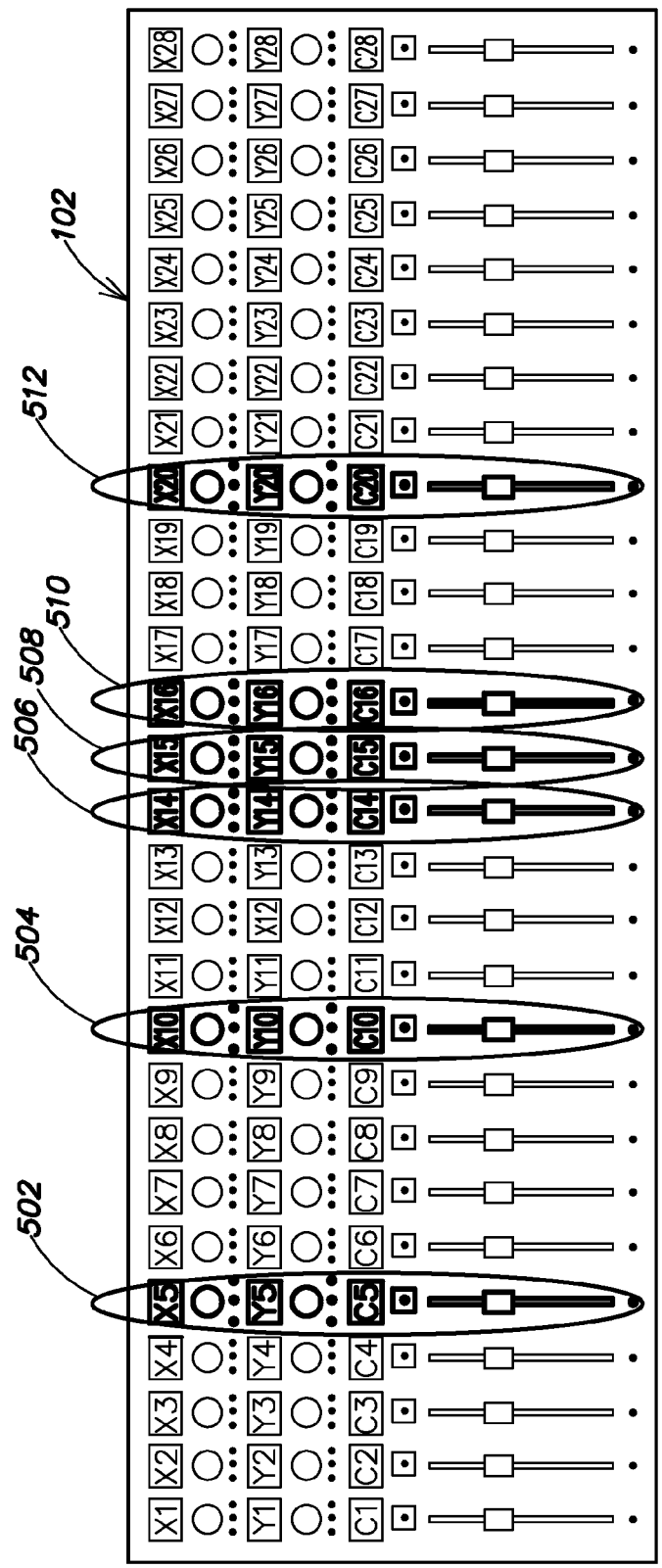
FIG. 5 is a diagrammatic illustration of an audio control surface in which channels that are related to each other are highlighted.

Certain controls are related to each other. For example, a VCA Master is related to its slave channels. Digital audio workstations (DAWs), such as Pro Tools® from Avid® Technology, Inc., of Burlington, Mass., make use of channel groups in which a set of channels is controlled by a master channel. When the operator changes a master channel parameter, such as the volume, each of the slave channels in its group change their levels in accordingly. Channel groups often include related instruments or sound sources, such as a drum kit group, or a set of vocal sources. It is useful for operators to see the relationships between the members of a channel group when a master level is being changed, or to see which channels belong to a given group when sources are added to or subtracted from the group. Visual highlighting may be used to focus the operator on such relationships. FIG. 5 illustrates the highlighting of channel 5 as a VCA Master (502), with slave channels 10 (504), 14 (506), 15 (508), 16 (510), and 20 (512) also highlighted. The VCA master may be highlighted in the same manner as its slaves, or highlighted in a different manner.

A temporary relationship between the controls of a first channel strip those of a set of adjacent channel strip may be established when an operator desired to assign more controls than are available on a given channel strip to control an audio channel assigned to that strip. When an operator invokes such an "expand mode" on a control surface, highlighting may serve to focus the eye on the controls involved, and remind the operator of their new, temporarily assigned functions. In a typical sequence, the operator enters the expand mode for a given channel strip by pressing an expand button or key on that channel strip, whereupon a number of adjacent controls become assigned to control parameters of the channel to which the given channel strip is assigned. For example, the two knobs of the given channel strip may be assigned to showing two parameters of an EQ function, such as Low Gain and Low Frequency. Upon entering the expand mode, an adjacent set of eight columns by two rows of knobs change to show 16 parameters of the EQ function on the given channel strip. This enables the operator to make rapid changes to 16 parameters at once, without the need to press Page Left and Page Right buttons to scroll to the EQ parameters. Visual focus is drawn to the 16 knobs by highlighting them to indicate that they are in the expand mode. The highlighting is removed when the operator switches out of the expand mode.

Figure 6A:
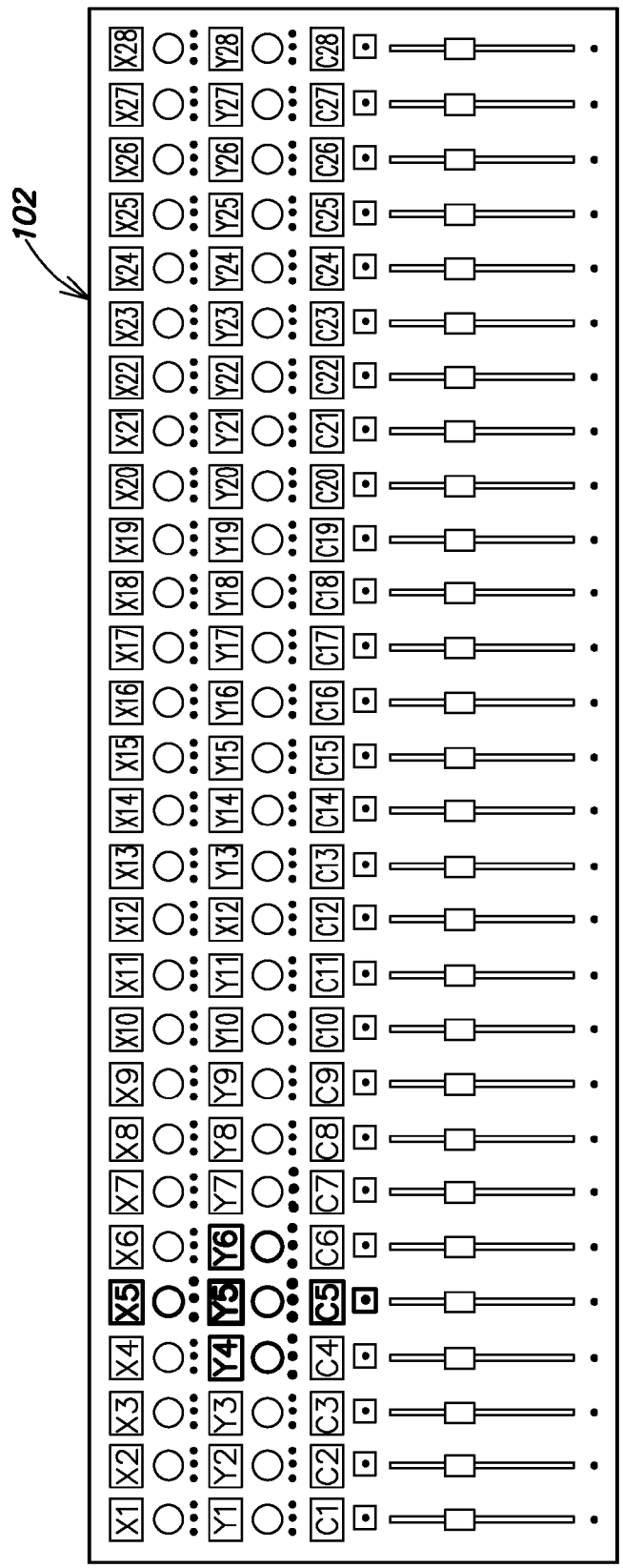
FIG. 6A is a diagrammatic illustration of an audio control surface in which a region that is proximate to the position of a user's hand is highlighted.
Figure 6B:
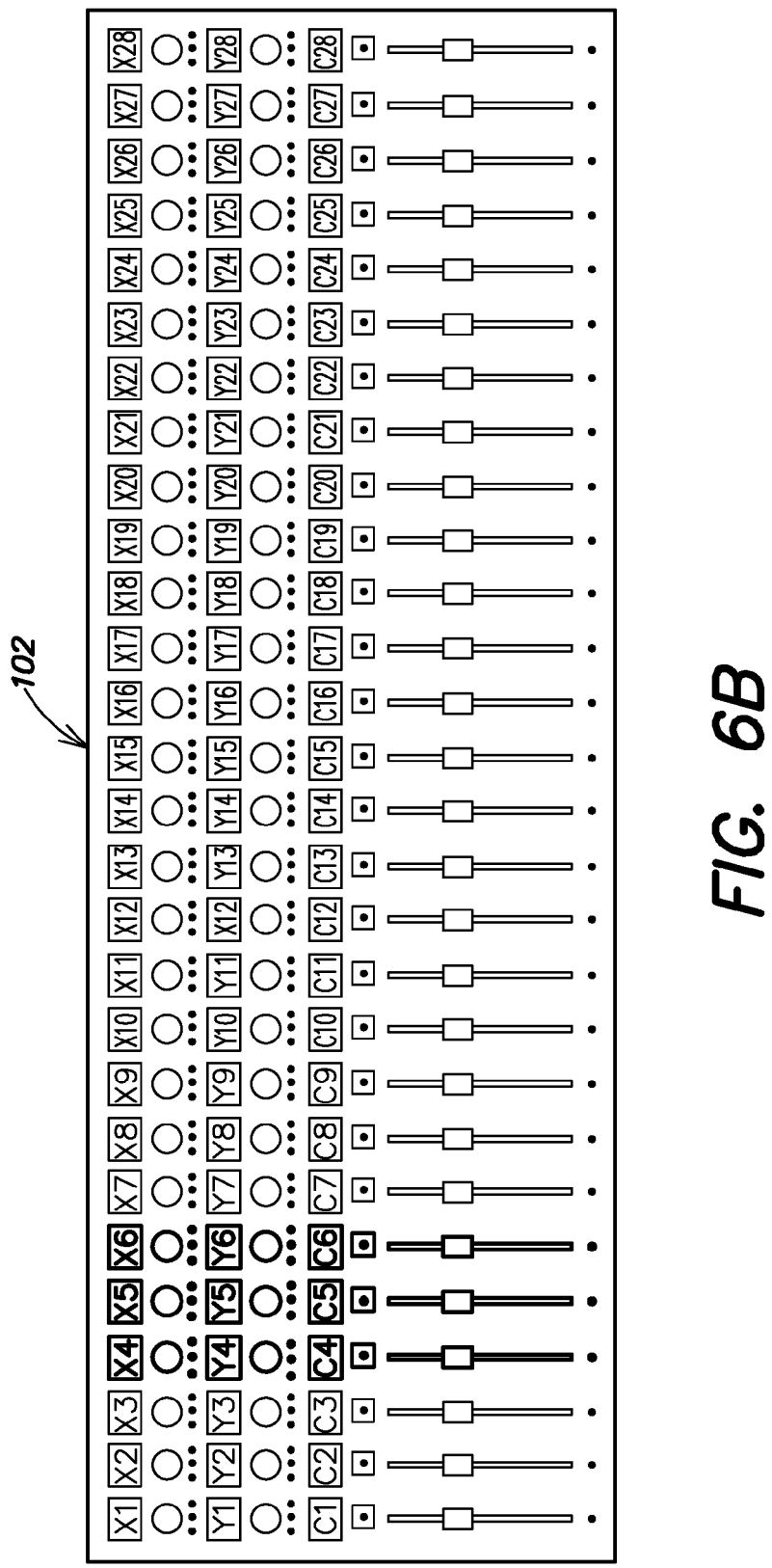
FIG. 6B is a diagrammatic illustration of an audio control surface in which complete channel strips that are proximate to the position of a user's hand are highlighted.

In audio control surfaces equipped with proximity sensors, placing a hand in proximity to a control, i.e., hovering near a control, may also trigger the highlighting of an area closest to the hand. If the hovering is followed by touching, the touched individual control or the entire channel strip containing the touched control is highlighted with a different highlight type from that used to indicate proximity. This enables an operator to see where his hand is located with respect to an audio surface's controls before touching a control, even in a low light environment, such as those found when mixing film, or in a dark auditorium of a live performance. This obviates the need to permanently illuminate all the controls of the control surface, so that the amount of unwanted stray light emitted by the surface may be reduced. FIG. 6A illustrates the highlighting of an area below a hand hovering over the surface. Hovering may also cause complete strips to be highlighted in the vicinity of the hand, as shown in FIG. 6B.

Figure 7:
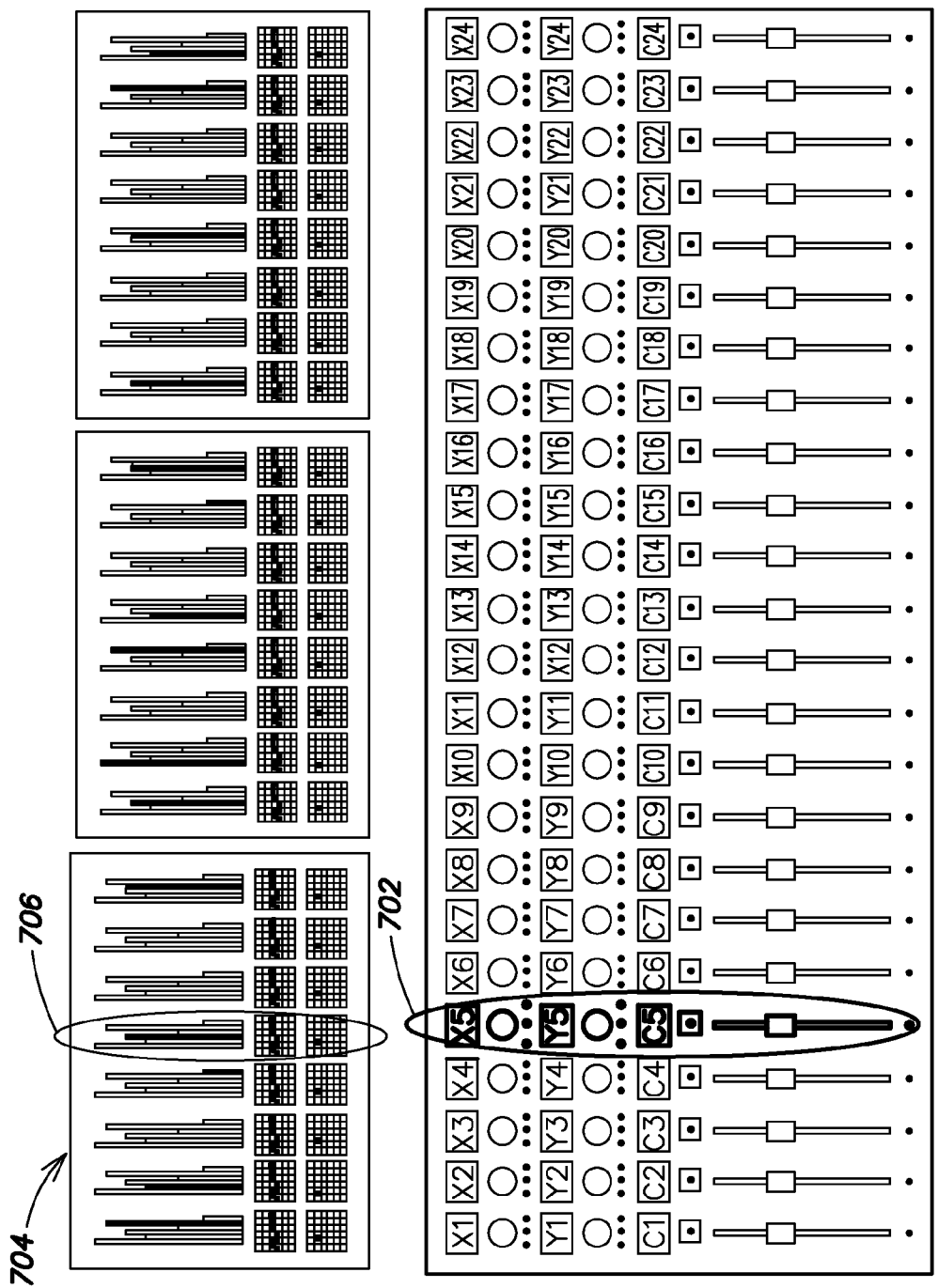
FIG. 7 is a diagrammatic illustration of an audio control surface and a connected video display in which both the physical controls and the video display-based controls of a given channel strip are highlighted.

In addition to the physical controls of the audio control surface, certain controls and parameters may be implemented graphically within a graphical user interface shown on a video display connected to the surface. Such controls may include parameters that are most informatively displayed using graphics, such as a waveform or a bar graph. These may either be interactively controlled, such as via touch control or via a pointing device, or they may be non-interactive displays of the values of certain parameters that may not be user-controlled, or may be controlled elsewhere. In either situation, the highlighting of the controls of a given channel strip may extend to highlighting additional parameters of the given strip that are shown on the video display. FIG. 7 shows the highlighting of physical controls 702 of channel 5 as well as the highlighting on video display 704 of additional controls 706 of channel 5 shown on the video display. The highlighting may be triggered with by operating or hovering near physical controls 702 or by touching graphically implemented controls 706.

Figure 8:
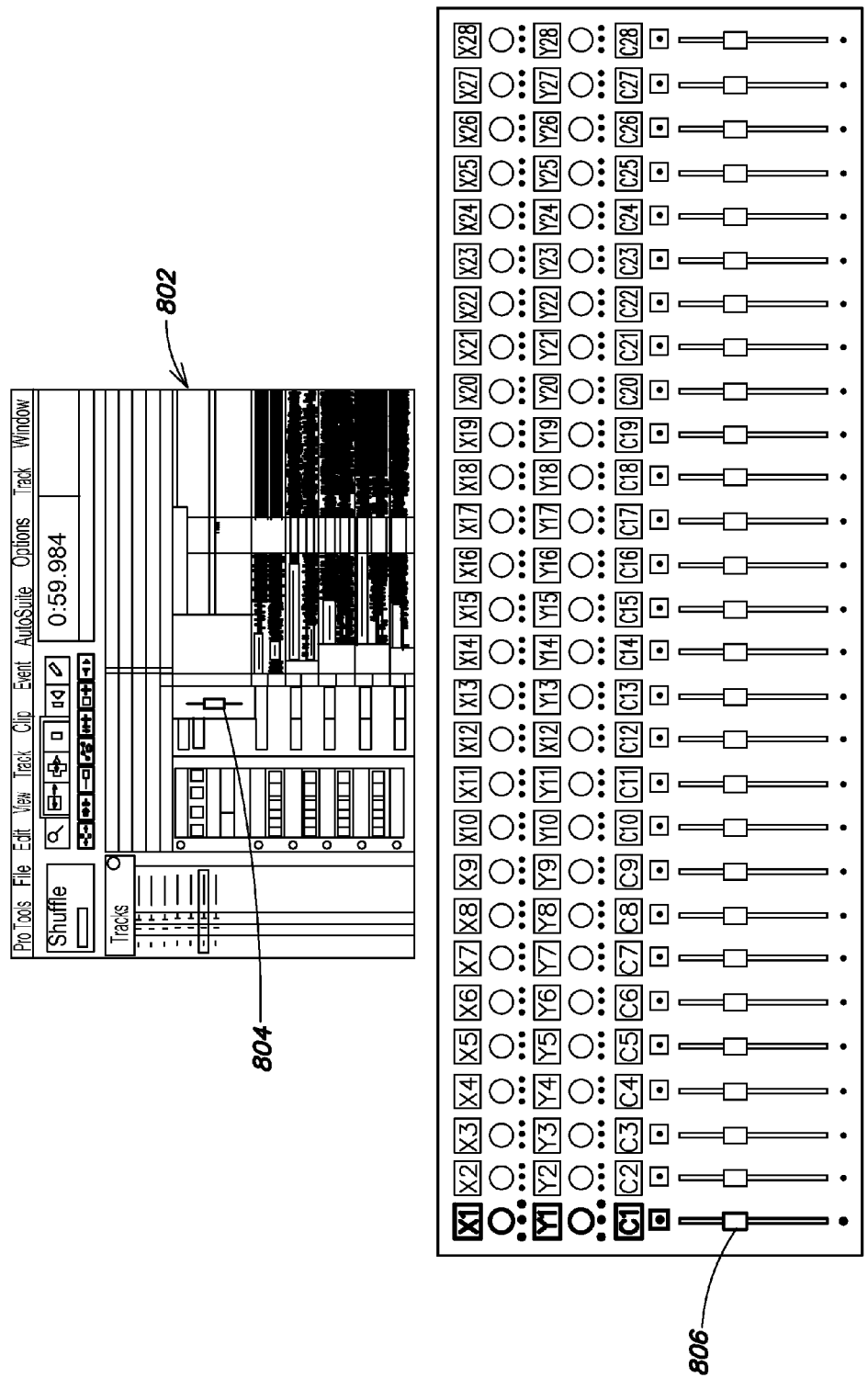
FIG. 8 is a diagrammatic illustration of an audio control surface in which a physical control is highlighted in response to manipulation of a corresponding virtual control on a display of a digital audio workstation connected to the audio control surface.

When using a digital audio workstation (DAW) in conjunction with the audio control surface, manipulating a control within a graphical user interface of the DAW may cause a corresponding control on the audio control surface to be highlighted. This is illustrated in FIG. 8, with DAW graphical user interface 802 having graphically implemented slider control 804 for controlling a given audio parameter, while the same audio parameter may also be controlled by highlighted physical control 806 on the audio control surface. In another example, selecting channels on the audio control surface causes the representation of the selected channels on the DAW graphical user interface to be highlighted.

Figure 9:
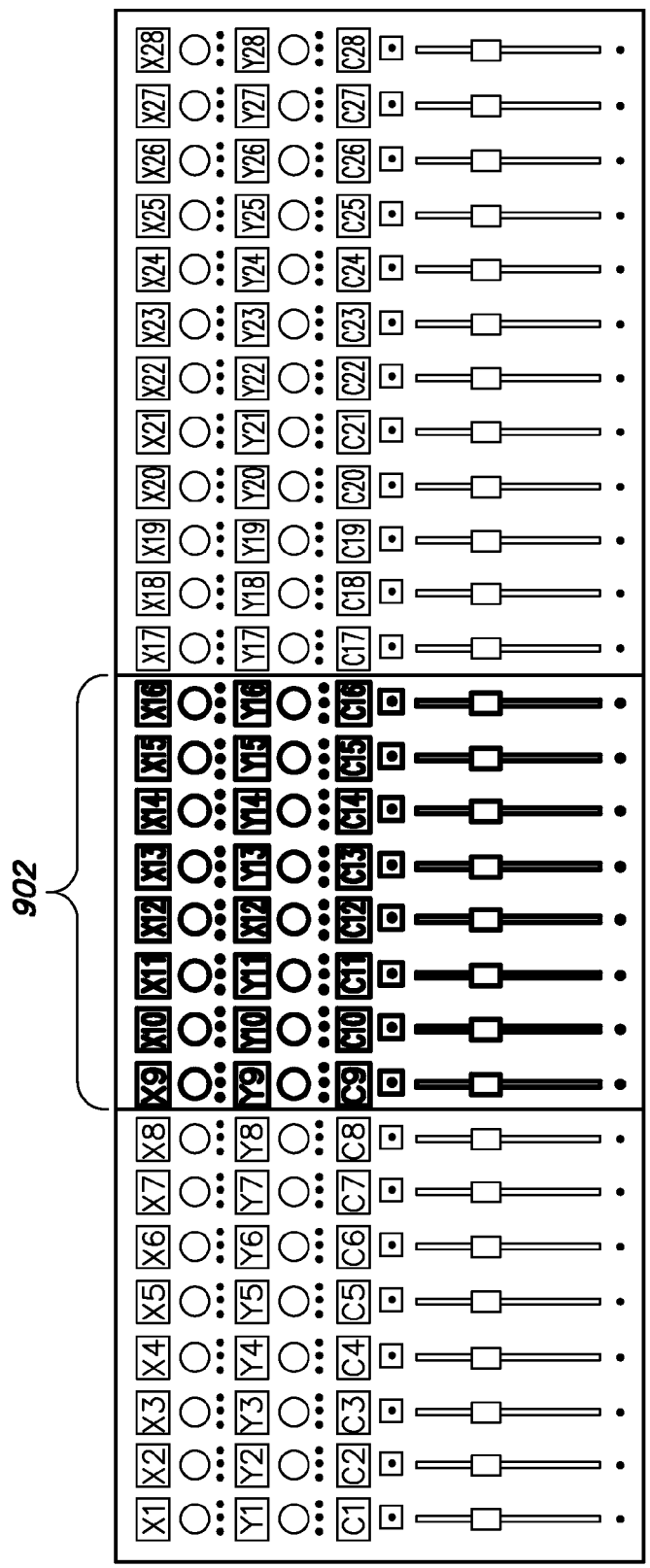
FIG. 9 is a diagrammatic illustration of an audio control surface in which the physical controls of an entire module are highlighted in response to manipulation of a control of the module.

An audio control surface may be built up from a number of separate modules, as described, for example, in U.S. Patent Publication No. 2014/0281979, entitled "Modular Audio Control Surface," which is wholly incorporated herein by reference. It may be helpful to focus an operator's attention on the entire module corresponding to a control most recently operated. Such a highlighting scheme may be deployed when mixing audio received from multiple DAWs, with each DAW being assigned to one or more physical modules of the audio control surface. When mixing the output from each DAW in turn, highlighting of an entire module serves to focus the operator's attention on the set of controls needed to mix the output from a given DAW. This highlighting scheme is illustrated in FIG. 9, in which the operator's attention is focused on audio control surface module 902 by highlighting all the controls on the module, i.e. channels 9-16.

The choice of controls to be highlighted to provide visual focus to an audio control surface operator may be customized by the operator through the use of presets. An operator may set up one or more presets for each editing context, such as for use in a live performance venue, a film editing studio, or a music studio. In each preset, the subset of controls that are anticipated to be used most often would be highlighted. For example, in a live venue context, the presets may include highlighting EQ, vocal levels, and stage monitor levels. The visual focus required for each context is activated by selecting the corresponding preset.

As discussed above, visual focus is provided to the operator by highlighting currently manipulated or currently hovered controls and those peripheral to it or related to it, or those that were manipulated in the recent past in order to provide a historical trace of the operator's activities. The various methods used to implement the highlighting of controls include the use of the intensity of illumination used to light a control, the color of illumination used to light a control, and a font characteristic used in text labelling of a control in the programmable display associated with the control.

In the audio control surfaces referred to herein, many of the physical controls have their own individually controllable source of illumination. For example, a parameter knob may be lit by a circular LED surrounding the base of the knob that shines light up to illuminate the sides of the knob. In other designs, the top surface of the knob is illuminated from within. Such a knob may be highlighted by lighting it with a higher intensity of illumination than other controls in its vicinity, or than any other controls on the audio control surface. Partial highlighting may be provided by using an intermediate brightness intensity. For example, the highlighting scheme illustrated in FIGS. 1A and 1B may use a high level of brightness to illuminate the channel strip manipulated at time $t_1$, shown as Channel 5 (118) in FIG. 1A. At a later time $t_2$ as shown in FIG. 1B, when the user is manipulating channel 23 (FIG. 1B,120), channel 23 is now illuminated at the same high level previously used to illuminate channel 5, and channel 5 is now dimmed, thus retaining highlighting, but with a lower intensity of illumination. In general, in such highlighting schemes, the brighter the intensity of illumination used to light a given control, the greater the degree of highlighting it embodies, and the greater the corresponding degree of visual attention focusing provided to the audio control surface operator.

In an alternative highlighting scheme that is also based on the illumination intensity of a control, the brightness of un-highlighted controls is dimmed relative to highlighted controls. In such schemes, many, if not all of the controls are lit by default at a high level of illumination intensity. Dimming the illumination of all the controls except the illumination of the controls being highlighted serves to provide visual focus, since the controls being highlighted are now brighter than their surrounding controls.

In highlighting schemes based on color, the color of the illumination used to light a highlighted control is different from that used to light non-highlighted controls. Such schemes require sources of illumination having controllable color, provided, for example, by blending light from several differently colored LED sources.

In the audio control surfaces described herein, certain controls are provided with programmable displays for labeling the controls, such as with the name of the audio parameter assigned to the control, as illustrated in FIGS. 1, 106, 110, and 114. The highlighting of such controls may be performed by applying a distinguishing font characteristic to the displayed text. Such characteristics include, but are not limited to, style (e.g., Times Roman, Helvetica, etc.), boldness, italicizing, size, color, and flashing on and off.

Any combination of the highlighting methods described above may be applied depending on the setting and context of the audio production task at hand.

The control of the various components of the audio control surfaces described herein may be implemented as a computer program using a general-purpose processing system, such as a microprocessor or a computer system such as workstation, laptop, tablet, or other device. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of focusing attention of a user of an audio control surface, the method comprising:
 (i) in response to the user operating a second physical control of the audio control surface, applying a second highlight type to the second physical control of the audio control surface, and applying a first highlight type to a first physical control, wherein the first physical control is the last physical control operated by the user prior to the user operating the second physical control, and wherein the first highlight type is different from the second highlight type, and both the first highlight type and the second highlight type serve to distinguish physical controls to which they are applied from non-highlighted physical controls; and (ii) subsequent to step (i), in response to the user operating a third physical control of the audio control surface, wherein the third physical control is the first physical control operated by the user after operating the second physical control:

applying the second highlight type to the third physical control of the audio control surface;

changing an applied highlight to the second physical control from the second highlight type to the first highlight type, wherein the third physical control is different from the first physical control and from the second physical control; and removing the first highlight type from the first physical control.

2. The method of claim 1, wherein the first highlight type comprises a first illumination intensity and the second highlight type comprises a second illumination intensity.

3. The method of claim 2, wherein the second illumination intensity is greater than the first illumination intensity.

4. The method of claim 2, wherein the audio control surface includes a plurality of physical controls in addition to and including the first and second physical controls, and wherein:

each of the plurality of physical controls is illuminated by a preset illumination intensity;

applying the second highlight type to a second given control comprises applying a second reduced illumination intensity to each of the plurality of physical controls except the second given control;

applying the first highlight type to a first given control comprises applying a second reduced illumination intensity to the second given control; and the first reduced illumination intensity is brighter than the second reduced illumination intensity.

5. The method of claim 1, wherein the first highlight type comprises a first illumination color and the second highlight type comprises a second illumination color.

6. The method of claim 1, wherein:

the audio control surface includes a plurality of physical controls in addition to and including the first and second physical controls;

each of the plurality of physical controls is labeled with a corresponding programmable display;

applying the first highlight type to a first given physical control comprises using the programmable display corresponding to the first given physical control to label the first given physical control using text having a first font characteristic;

applying the second highlight type to a second given physical control comprises using the programmable display corresponding to the second given physical control to label the second given physical control using text having a second font characteristic; and the first and second font characteristics are different from a font characteristic used in text on corresponding programmable displays labelling each of the physical controls other than the first and second physical controls.

7. A method of focusing attention of a user of an audio control surface, the method comprising:

in response to the user operating a first physical control of the audio control surface:

applying a first highlight type to the first physical control of the audio control surface; and applying a second highlight type to a second control of the audio control surface, wherein the second control of the audio control surface was the last control operated by the user prior to operating the first physical control; and applying one of a third highlight type and no highlight to a third control of the audio control surface such that each of the first highlight type and the second highlight type serve to distinguish the first and second controls respectively from the third control, wherein the third control was the last control operated by the user prior to operating the second control.

8. The method of claim 7, wherein the second highlight is substantially the same as the first highlight.

9. The method of claim 7, further comprising:

in response to the user positioning a finger in proximity to the first physical control, applying a fourth highlight type to the first physical control of the audio control surface.

10. The method of claim 9, wherein the fourth highlight type is substantially the same as the first highlight type.

11. The method of claim 9, further comprising:

in response to the user positioning a finger in proximity to the first physical control, applying a fifth highlight type to a second control of the audio control surface.

12. The method of claim 11, wherein the fifth highlight type is substantially the same as the second highlight type.

13. The method of claim 11, wherein the second control is spatially proximate to the first physical control.

14. The method of claim 7, wherein the second control is spatially proximate to the first physical control.

15. The method of claim 7, wherein the first physical control controls a first audio parameter of a given functional type and the second control controls a second audio parameter of the given functional type.

16. The method of claim 7, wherein the first physical control controls a first audio parameter, the second control controls a second audio parameter, and the second audio parameter is related to the first audio parameter.

17. The method of claim 16, wherein the first audio parameter is a VCA master parameter and the second audio parameter is a slave parameter of the VCA master parameter.

18. The method of claim 7, wherein:

the first physical control of the audio control surface is an expand mode switch of a first channel strip;

the first channel strip is assigned to control parameters of a first audio channel;

the second control of the audio control surface is a control of a second channel strip; and when an expand mode of the first channel strip has been selected by operating the expand mode switch of the first channel strip, the second control is temporarily assigned to control a parameter of the first channel.

19. The method of claim 7, wherein the second control is a physical control, and wherein the first and second physical controls belong to a given module of the audio control surface, and wherein the given module comprises a plurality of physical controls, further comprising applying the second highlight type to each physical control of the plurality of physical controls of the given module.

20. The method of claim 7, wherein the second control is displayed on a video display in data communication with the audio control surface.

21. The method of claim 7, wherein:
the first highlight type comprises a first illumination intensity; and
if the second control of the audio control surface is a physical control, the second highlight type comprises a second illumination intensity.

22. The method of claim 7, wherein the second physical control is one of a set of one or more physical controls specified by the user, wherein a highlight is applied to each of the set of one or more physical controls in addition to the second control when the user operates the first physical control.

23. An audio control surface comprising:
a plurality of physical controls, wherein each physical control of the plurality of physical controls comprises:
illumination for applying a highlight to the physical control; and
a processor for controlling the illumination, wherein the processor is configured to:
(i) in response to a user operating a second physical control of the audio control surface, causing the processor to apply a second highlight type to the second physical control of the audio control surface, and causing the processor to apply a first highlight type to a first physical control, wherein the first physical control is the last physical control operated by the user prior to the user operating the second physical control, and wherein the first highlight type is different from the second highlight type, and both the first highlight type and the second highlight type serve to distinguish physical controls to which they are applied from non-highlighted physical controls; and
(ii) subsequent to step (i), in response to the user operating a third physical control of the audio control surface, wherein the third physical control is the first physical control operated by the user after operating the second physical control causing the processor to:
apply the second highlight type to the third physical control of the audio control surface;
change an applied highlight to the second physical control from the second highlight type to the first highlight type, wherein the third physical control is different from the first physical control and from the second physical control; and
remove the first highlight type from the first physical control.

24. A method of focusing attention of a user of an audio control surface, the method comprising:
applying a set of three different highlight states to a set of three different physical controls of the audio control surface, wherein the set of applied highlight states indicates a temporal sequence in which:
a first control of the set of three different physical controls was most recently operated; and
a second control of the set of three different physical controls was a second most recently operated physical control; and
a third control of the set of three different physical controls was not a most recent or a second most recent physical control to have been operated by the user.

* * * * *